J. F. LOCKWOOD.
AWNING.
APPLICATION FILED NOV. 2, 1910.
1,092,496.
Patented Apr. 7, 1914.
4 SHEETS—SHEET 1.
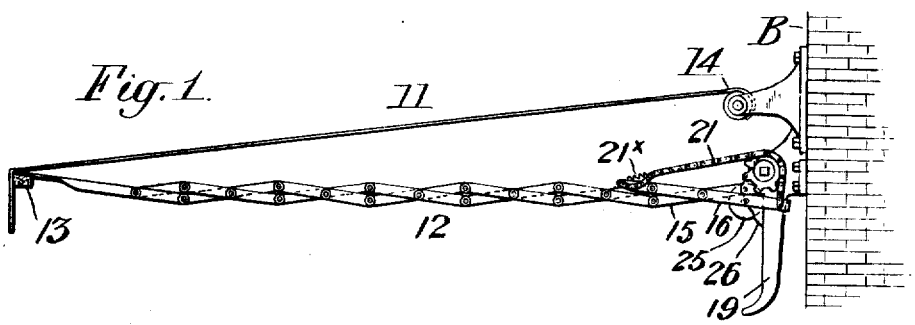
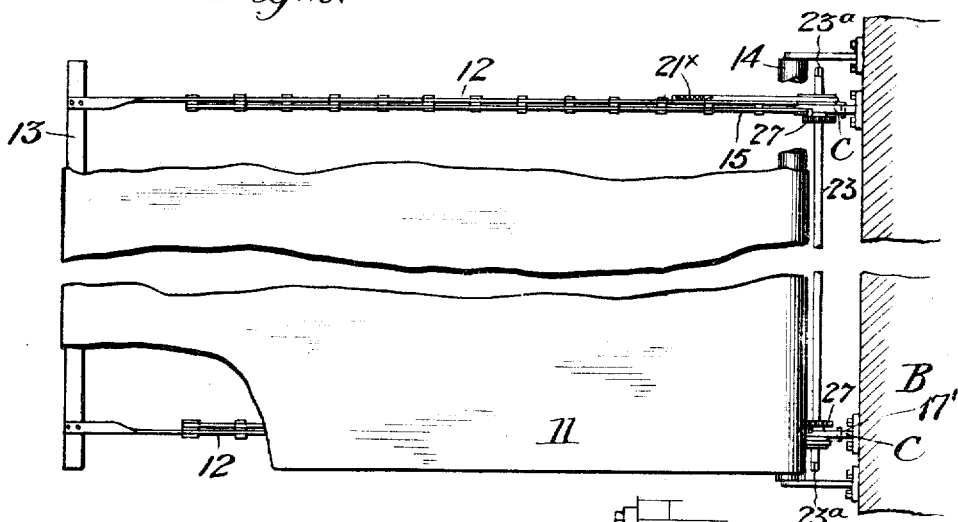
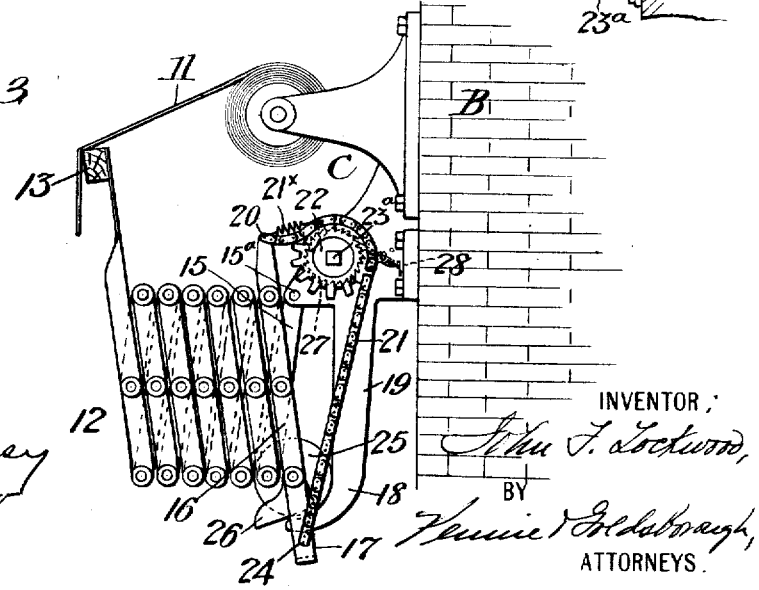

J. F. LOCKWOOD.
AWNING.
APPLICATION FILED NOV. 2, 1910.
1,092,496.
Patented Apr. 7, 1914.
4 SHEETS—SHEET 2.
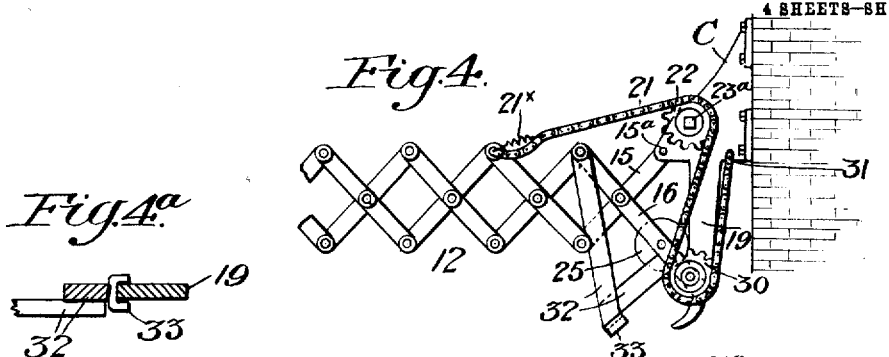
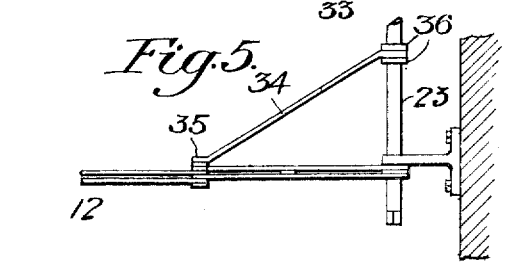
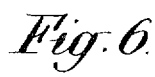
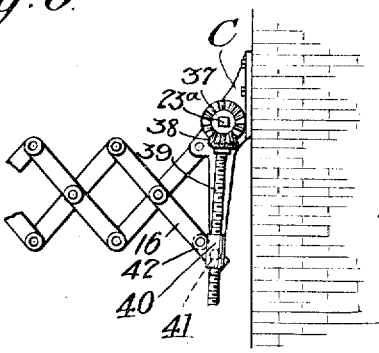
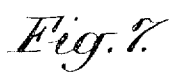
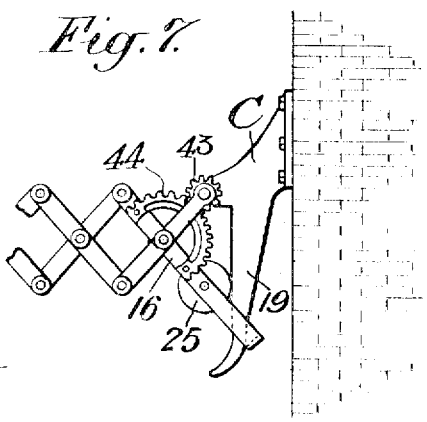
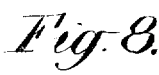
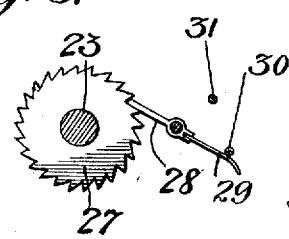
WITNESSES:
INVENTOR:
John F. Lockwood,
BY
ATTORNEYS J. F. LOCKWOOD.
AWNING.
APPLICATION FILED NOV. 2, 1910.
1,092,496.
Patented Apr. 7, 1914.
4 SHEETS—SHEET 3.
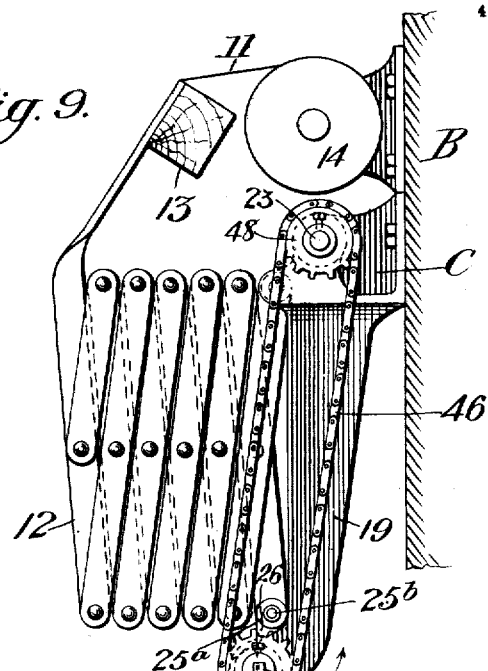
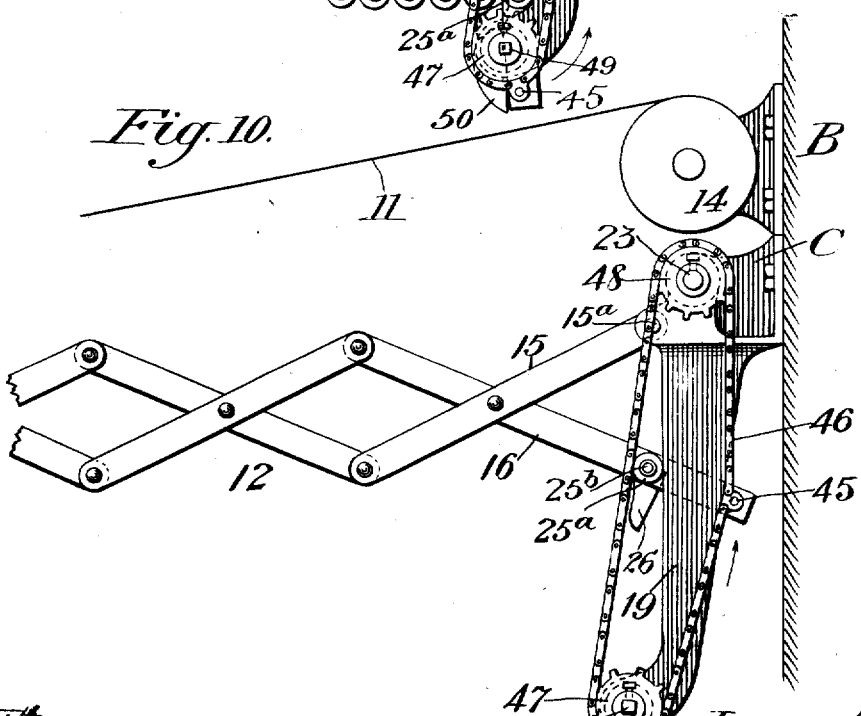

J. F. LOCKWOOD.
AWNING.
APPLICATION FILED NOV. 2, 1910.
1,092,496.
Patented Apr. 7, 1914.
4 SHEETS—SHEET 4.
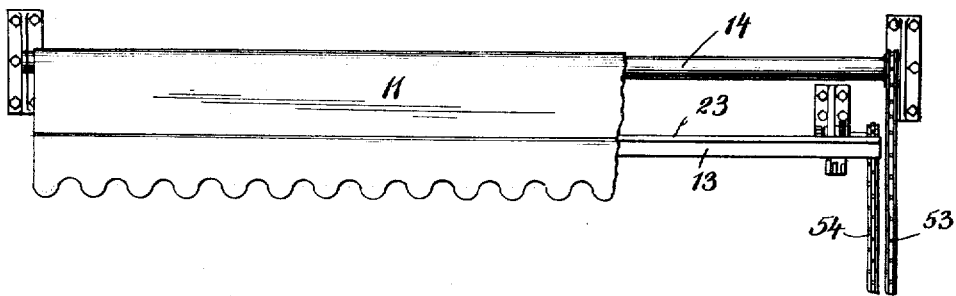
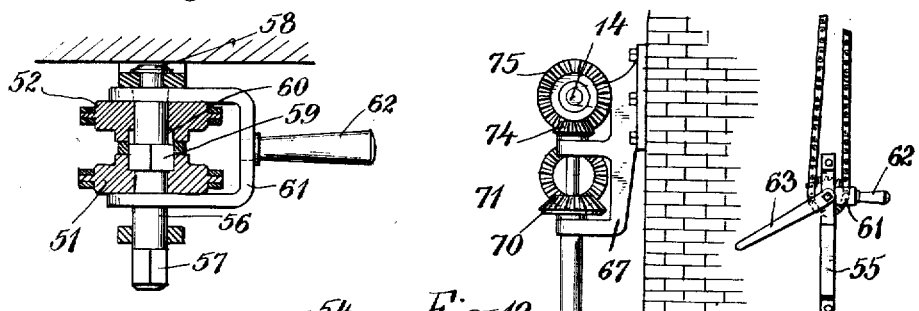
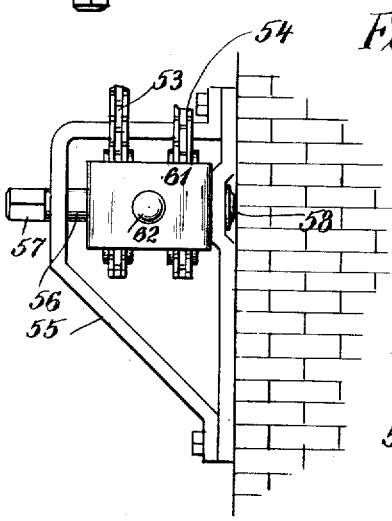
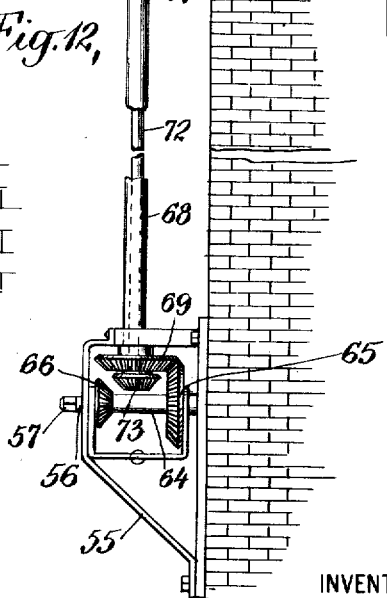
WITNESSES:
INVENTOR
John F. Lockwood
BY
ATTORNEYS

UNITED STATES PATENT OFFICE.

JOHN F. LOCKWOOD, OF KANSAS CITY, MISSOURI.

AWNING.

1,092,496.  Specification of Letters Patent.  Patented Apr. 7, 1914.

Application filed November 2, 1910. Serial No. 590,317.

*To all whom it may concern:*

Be it known that I, JOHN F. LOCKWOOD, a citizen of the United States, residing at and whose post-office address is Kansas City, county of Jackson, State of Missouri, have invented certain new and useful Improvements in Awnings; and I do hereby declare the following to be a full, clear, and exact description of the invention, such as will enable others skilled in the art to which it appertains to make and use the same.

This invention has reference to mechanism for supporting, extending and retracting awnings, and more especially to awnings that are supported and projected outward from the building wall by means of sets of lazy tongs arranged at the ends of the awning and sometimes at intermediate points. Although awning fixtures of this kind have been heretofore proposed, they have met with indifferent success, owing to the fact that they have not embodied efficient, reliable and satisfactory means for projecting and retracting the sets of lazy tongs.

Under these conditions, the object of my invention is to provide improved means for projecting and retracting the lazy tongs, whereby such projection and retraction may be produced with great ease and facility, there being associated with the projecting and retracting mechanism, suitable devices to guide and sustain the lazy tongs in their movement and to brace them when they are fully extended, so that the awning proper will be strongly supported from the building wall.

In the drawing:—Figure 1 is a side elevation of an awning constructed in accordance with the invention, shown in its projected position; Fig. 2 is a top plan view of the same, with certain parts broken away; Fig. 3 is an enlarged side elevation of the awning as it appears when retracted against the building wall; Fig. 4 is a side or end elevation of a modified form of the projecting and retracting mechanism; Fig. 4ᵃ is an enlarged detail of a portion of Fig. 4; Fig. 5 is a top plan view of a modification wherein each set of lazy tongs is provided with a lateral brace rod; Figs. 6 and 7 illustrate in side elevation further modifications of the projecting and retracting mechanism; Fig. 8 is a schematic view of the pawl and ratchet mechanism illustrated in Fig. 3; Fig. 9 is a side elevation of a still further modified form of projecting and retracting mechanism, showing the awning retracted; Fig. 10 is a view similar to Fig. 9, showing the awning partially extended; Fig. 11 is a front elevation of extending and retracting mechanism and an associated double chain box and transmitting chains, whereby the awning may be conveniently worked from a point near the ground; Fig. 12 is a side elevation of a bevel-gear and rod mechanism adapted to the same purpose; and, Figs. 13 and 14 are respectively a plan view and a side elevation of the double chain box.

Referring more particularly to Figs. 1 to 3, the awning 11 is shown as adapted to be projected in a substantially horizontal direction from the front face or wall of the building B, by means of sets of lazy tongs 12 that are located at opposite ends of the awning. The awning cloth is applied at its forward or front edge to a bar 13 to which the end units of the lazy tong sets are applied; and the awning is adapted to be wound up on a roller 14 that may be conveniently supported on the building wall by means of suitable brackets, as shown. For light awnings the roller 14 may conveniently be a spring roller so that when the lazy tongs are retracted, the awning will be wound up on said roller, the spring of the latter also acting to tension the awning properly when the latter is projected. For heavier awnings, however, I prefer to provide separate hand-actuated mechanism for winding up the awning on the roller, and such mechanism of an improved form, will be hereinafter described. Each set of lazy tongs 12 is made up in the usual way of a number of units, and one of the end units (indicated at 15) is pivoted at 15ᵃ to a bracket C applied to the building wall. In the embodiment shown, two of these brackets are employed, one at each end of the awning. The other end of the lazy tongs, denoted by reference character 16, is longer than the other units and has at its lower end an extension, as indicated at 17, in order to fit over the lower hook shaped end 18 of a shank 19 that projects downward from, and preferably forms part of, the corresponding bracket C. The upper end of the unit 16 has secured thereto at 20 one end of a chain 21 which runs over a sprocket 22, keyed to the end of a shaft 23 journaled in the brackets C, the opposite end of the chain being connected at 24 with the lower end of the unit 16. Said unit is provided intermediate of its ends with a roller 25 intended to ride along the front edge of the shank 19, which edge forms a vertically directed guiding surface on the bracket C. The unit 16 is also provided with a foot 26 adapted to rest against the said guiding surface when the lazy tongs are extended into the position shown in Fig. 1, thereby supporting the lazy tongs firmly in position. The shaft 23 serves as an operating shaft, and it may be actuated by any hand-operated mechanism suitable for the purpose, though I prefer to employ the double-box and transmitting chains, or rods and gears, hereinafter described. In order to lock the shaft in a predetermined position, against retraction of the awning by the spring, if a spring roller is used, the shaft may have applied thereto ratchets 27 with which co-act pawls 28 pivoted on the brackets C. Each of said pawls is equipped with a flat spring 29 coöperating with pins 30 and 31 fixed on the adjacent bracket, said pins being so located that when the spring 29 is placed against the pin 30 in the position indicated in Fig. 8, the pawl will lock the ratchet in position, while the pin 31 is adapted to hold the spring 29, and therefore the pawl 28, in inoperative position. The operation of this form of the device is as follows: If the parts are in the position shown in Fig. 3, that is to say, if the awning is retracted, the projection of the same is produced by rotating the shaft 23 by means of the mechanism provided for that purpose, as previously indicated, the direction of rotation being such that each chain 21 will be pulled up over the rotating sprocket 22, thereby elevating the lower end of the corresponding unit 16, depressing its upper end, and moving each set of lazy tongs into the extended position shown in Fig. 1. Of course this results in the outward movement of the bar 13 applied to the front lazy tong units, whereby the awning will be unrolled from the roller 14 and projected outward from the building. During the projection of the lazy tongs, the roller 25 of the end unit 16 is effectively guided along the depending portion of the bracket C so that the lazy tongs as a whole will be guided into their ultimate position, and the foot 26 carried by said unit 16 will rest against the front edge of said depending bracket when the lazy tongs are fully extended, whereby the latter will be braced laterally in order to sustain firmly the downward pressure exerted by the awning and the lazy tongs themselves. When the parts have reached the position shown in Fig. 1, the pawls 28 are, if a spring roller is used, placed in contact with their respective ratchets 27, and the whole awning structure will then be locked in the position indicated. It is obvious that the lower end of the unit 16 is not only guided on the bracket C by means of the roller 25, but also by the embracing part 17, which slides up along the shank 19, the shank being of such size at its upper portion that the inturned portion 17' of member 17 wedges against the rear surface of shank 19 to aid in holding the awning rigidly in the extended position. It will be understood that owing to the fact that the pivot 15ª of the unit 15, and the shaft 23, are not concentric with each other, the tension in the chain 21 will not be uniform at all times, and hence I find it advisable to use a self-acting tensioning device in the form of a small helical spring 21ˣ connected at its ends to different links of the chain, the effect of this spring being to take up any slack in the chain that may occur during the operation of the lazy tongs, as will be manifest. It is obvious that when it is desired to retract the awning, the pawl 28 is thrown to its inoperative position and the operations described are reversed, the awning being wound up on its spring roller 14, as the awning bar 13, together with the lazy tongs, is drawn inwardly, owing to the rotation of the operating shaft 23 in a direction opposite to that first indicated.

In the modification shown in Fig. 4, the same general principle of operation is adhered to, but in this case two sprocket wheels are employed in connection with the chain, and said sprocket wheels are so arranged that the turning moment necessary to project the lazy tongs is reduced one half, as compared with the first embodiment described. The chain 21 runs over a sprocket 22 applied to the shaft 23 as before, and it also runs over an additional sprocket 30 journaled on the lower end of the end unit 16. One end of the chain is applied to the second lazy tongs unit in this case, while the opposite end is carried up from the sprocket 30 and fixedly attached at 31 to the bracket C. The usual roller 25 is employed in connection with the unit 16, but the foot 26 of the first form is dispensed with, and in this instance I employ an angular brace 32 formed of strips, which, in connection with the unit 16, form a triangular structure. It will be apparent that when the lazy tongs are in their extended position this brace will abut against the forward edge of the shank portion 19 of the bracket, and when the parts are in this position, said shank portion is straddled by a bifurcated lug 33 (Fig. 4ª) formed at the lower apex of the triangular brace 32, which lug will prevent the lazy tongs structure from wabbling in a lateral direction, as will be understood.

In Fig. 5 I have shown a steadying brace which is applicable wherever the upper pivot of the unit 15 is concentric with the shaft 23, as, for example, in Fig. 7. When this arrangement is used I am enabled to brace said unit, and therefore the lazy tongs structure as a whole, in a lateral direction, by means of a brace 34 pivoted at its outer end to the outer pivot of the unit 15, the inner end of said brace being extended around the shaft 23 between the collars 36 thereon, the brace being freely movable about the shaft between said collars. It will be understood that when this construction is used, the brace 34 will partake of the movement of the unit 15 when the lazy tongs are actuated, said brace being swung up and down in a vertical plane in the same way that the unit 15 is swung up and down, and in this way the lazy tongs structure is reliably braced and prevented from wabbling in a horizontal plane.

In some cases, as where the awning is very heavy and difficult to project and retract, I may operate the lazy tongs by means of a screw spindle, as shown in Fig. 6. In this instance, the end of the shaft 23 carries a bevel-gear 37 which meshes with a similar gear 38 carried at the upper end of a screw spindle 39 supported alongside the bracket C. Threaded on the spindle 39 is a nut 40 which is swiveled at 41 on the lower end of the unit 16, said unit being equipped at a point adjacent said nut with a roller 42, to ride along the vertical guiding surface of the bracket, as before. It will be understood that when the shaft 23 is rotated, the consequent rotation of the screw spindle 39, in one or the other direction, will cause the corresponding movement of the nut 41 along said spindle, said nut being fed upward to produce the extension of the lazy tongs, and downward to fold up or retract the same. Owing to the fact that the nut 40 is swiveled on the unit 16, it will move properly along the threaded spindle in spite of the different positions which the unit 16 assumes, as will be manifest.

In the form shown in Fig. 7, the upper pivot of element 15 is on shaft 23 and the end of that shaft is equipped with a small spur pinion 43 which meshes with a gear segment 44 applied to the end unit 16 of the lazy tongs. Said end unit is guided vertically on the bracket by means of a roller 25, as before. The operation of this device will be obvious, the extension and retraction of the lazy tongs being produced by swinging one of the end units positively and in a vertical plane, as usual. This construction is of peculiar utility where the awning and the awning fixtures are heavy and difficult to move.

In the modification illustrated in Figs. 9 and 10, the end unit 16 is guided vertically on the shank 19 of the bracket C by means of a small roller 25$^a$ applied to one face of said unit by means of a small pivot pin 25$^b$. The lower extremity of the unit 16 is connected at 45 to an endless chain 46 running over sprockets 47 and 48. The sprocket 47 is removably journaled on the lower end of the bracket C, as indicated at 49, and the sprocket 48 is secured to the end of the shaft 23. At the lower end of the shank 19 there is provided a stop 50 against which the lower end of the unit 16 is adapted to abut when the lazy tongs are retracted. It is apparent that when the parts are in the position shown in Fig. 9, the extension of the lazy tongs and of the awning may be produced by turning the shaft 23 in such a direction that the endless chain 46 will move in the direction of the arrow, whereby the lower end of the unit 16 will be carried upward, as before, the upper end of said unit being moved downward to a corresponding extent. In Fig. 10, the parts are shown as they appear when the lazy tongs are only partially extended, it being evident that a further movement of the chain in the direction of the arrow will extend the lazy tongs to a greater distance from the building wall.

It is customary to provide, in connection with awning extending and retracting devices, suitable transmission chains, ropes or rods, extending down to a position convenient to the operator, and any suitable mechanism of this character may be used in connection with my improved lazy tong extending and retracting device. If a spring roller is used it is only necessary to provide such mechanism to actuate the shaft 23, but otherwise it is necessary to provide also mechanism for actuating the shaft of roller 14, to wind up the awning thereon. For the purpose of simplifying and making more convenient this double operation of winding up the awning on roller 14 and retracting the lazy tongs, I have devised the double-box and associated mechanism illustrated in Figs. 11 to 14 inclusive.

In the construction of Fig. 11 the extended end of roller 14 carries a sprocket wheel as shown, and the extended end of shaft 23 carries another sprocket wheel. Running over these two sprocket wheels, and over two sprocket wheels 51 and 52 in the double-box (see Fig. 13) are the two chains 53 and 54, respectively. The double-box comprises a bracket-frame 55 fastened to the wall of the building and in which is journaled an actuating pin or stub-shaft 56, having a squared outer end 57, and an enlarged head 58 to prevent outward movement of the pin or stub-shaft. The shaft 56 is cylindrical throughout the greater part of its length, but has a centrally located squared enlargement or hub 59. The two sprocket wheels 51 and 52 slide loosely on the cylindrical portions of the shaft 56, but have correspondingly squared recesses 60 facing the squared hub 59 so that by sliding the sprockets along the shaft the one or the other of them may be operatively connected to the shaft, to rotate therewith. The two sprocket wheels 51 and 52 are spanned by a yoke or clevis 61, having a handle 62, by which the sprockets may be slid along the shaft to the desired position. With the clevis in the intermediate position the two sprockets may be rotated simultaneously. A crank 63, see Fig. 11, is provided for turning the shaft 56. The operation of this mechanism is as follows: To project the awning it is preferable to push the clevis 61 toward the building, as shown in Fig. 13, to connect sprocket wheel 51 to shaft 56, and then by turning crank 63 in the proper direction unroll a foot or so of the cloth, then shift the clevis to disconnect sprocket 51 and connect sprocket 52, and by turning the crank actuate shaft 23 to project the lazy tongs, which will at the same time draw the remainder of the awning off the roller, the slack portion first unrolled permitting the lazy tong movement to start freely. After this projection is accomplished it is well to shift back to sprocket 51 and roll up any slack there may be in the awning. To retract the awning the lazy tong structure is first slightly collapsed by shifting the clevis to sprocket 52, then by shifting back to sprocket 51 the awning is tightly rolled up on the roller 14, at the same time completing the collapse of the lazy tongs.

In Fig. 12 I have shown a bevel-pinion and rod structure which is substantially the equivalent of the structure just described. In this case a hollow shaft 64 slides on but turns with stub-shaft 56, and carries at one end a larger bevel-gear 65 and at the other end a smaller bevel-gear 66. Supported by a suitable bracket 67 and extending down into the double box, is a tubular shaft 68 carrying at its lower end a bevel pinion 69 adapted to mesh with pinion 65, and at its upper end a bevel pinion 70 meshing with a corresponding pinion 71 on the end of shaft 23. Within the tubular shaft 68, and projecting from the ends thereof, is a shaft 72 which carries at its lower end a bevel pinion 73 adapted to mesh with pinion 66, and at its upper end a pinion 74 meshing with the pinion 75 on the end of roller 14. As will readily be understood, the clevis may in this case be shifted to operate either the shaft 23 or the roller 14, and thus extend or retract the awning in the manner just described in connection with the double chain mechanism.

I wish it to be understood that although I have described several modifications of the invention, it has not been possible for me to describe all of the different forms of the construction that may be adopted without digressing from the underlying inventive idea. So far as I am aware, I am the first to operate a lazy tongs awning by an operating force that is applied directly and positively to the lazy tongs units, by means operated from a common rotary shaft that connects the several sets of lazy tongs, and my claims in that connection should be interpreted accordingly. I also know of no instance where a lazy tongs awning has been operated by a positively operated geared connection with one or more of the lazy tongs units. Furthermore I am, so far as I know, the first to provide, for the purpose of actuating both the awning projecting and retracting device and the awning roller, a single crank shaft with associated transmitting mechanism extending to the projecting and retracting device and to the awning roller, together with means for clutching the crank shaft to the one or the other device at will.

What I claim is:—

1. The combination of a bracket applied to the building wall and having a depending portion or shank, a set of lazy tongs supported on said bracket, means connected with one of the lazy tong units and operative to project and retract the lazy tongs, and means to guide one end of said unit along the depending portion or shank of the bracket.

2. The combination of a bracket applied to the building wall, a set of lazy tongs supported on said bracket, means acting upon one of the lazy tong units and operative to project and retract the lazy tongs, means to guide the lower end of said unit in a substantially vertical direction adjacent the building wall, and means carried by said unit to abut laterally against the bracket when the lazy tongs are extended, whereby the weight of the structure is transmitted to the building wall in a lateral direction.

3. Awning projecting and retracting mechanism comprising a bracket fixed to the building, a set of lazy tongs supported by said bracket, a pair of sprocket wheels, an endless chain running over said sprocket wheels, one of the units of said lazy tongs being connected to said chain, and mechanism for rotating the sprocket wheels to move the chain and connected unit to project and retract the awning.

4. In awning projecting and retracting mechanism, an awning roller, a set of lazy tongs having one of its outer units fastened to the awning, gearing for projecting the lazy tongs, and separate gearing for actuating the roller.

5. In awning projecting and retracting mechanism, an awning roller, a set of lazy tongs having one of its outer units fastened to the awning, gearing for projecting the lazy tongs, separate gearing for actuating the roller, a winding shaft and mechanism for clutching the winding shaft to either of said gearings at will.

6. In awning projecting and retracting mechanism, an awning roller, actuating gearing therefor, actuating gearing for projecting the awning, a winding shaft, and mechanism for clutching the winding shaft to either of said gearings at will.

In testimony whereof I affix my signature, in presence of two witnesses.

JOHN F. LOCKWOOD.

Witnesses:
EDITH WILSON,
KATE STOLTZFUS.

It is hereby certified that in Letters Patent No. 1,092,496, granted April 7, 1914, upon the application of John F. Lockwood, of Kansas City, Missouri, for an improvement in "Awnings," an error appears in the printed specification requiring correction as follows: Page 1, line 98, after the word "end" insert the word *unit;* and that the said Letters Patent should be read with this correction therein that the same may conform to the record of the case in the Patent Office.

Signed and sealed this 12th day of May, A. D., 1914.

[SEAL.]

J. T. NEWTON,

*Acting Commissioner of Patents.*